(12) United States Patent
Sankaranarayanan et al.

(10) Patent No.: US 12,107,837 B2
(45) Date of Patent: Oct. 1, 2024

(54) CLOUD BASED MACHINE LEARNING NOTEBOOK DATA LOSS PREVENTION

(71) Applicant: Oracle International Corporation, Redwood Shores, CA (US)

(72) Inventors: Hari Bhaskar Sankaranarayanan, Bangalore (IN); Jean-Rene Gauthier, Temecula, CA (US)

(73) Assignee: Oracle International Corporation, Redwood Shores, CA (US)

( * ) Notice: Subject to any disclaimer, the term of this patent is extended or adjusted under 35 U.S.C. 154(b) by 279 days.

(21) Appl. No.: 17/715,650

(22) Filed: Apr. 7, 2022

(65) Prior Publication Data

US 2023/0328037 A1    Oct. 12, 2023

(51) Int. Cl.
  *H04L 9/40* (2022.01)
  *G06F 21/60* (2013.01)
  *G06N 5/022* (2023.01)

(52) U.S. Cl.
  CPC ............ *H04L 63/04* (2013.01); *G06F 21/602* (2013.01); *G06N 5/022* (2013.01); *H04L 63/1433* (2013.01)

(58) Field of Classification Search
  CPC ..... H04L 63/04; H04L 63/1433; G06N 5/022; G06F 21/602
  See application file for complete search history.

(56) References Cited

U.S. PATENT DOCUMENTS

| | | | |
|---|---|---|---|
| 8,914,892 B2 | 12/2014 | Karande et al. | |
| 10,154,039 B1 | 12/2018 | Andruschuk et al. | |
| 10,198,399 B1 | 2/2019 | Fritchman et al. | |
| 10,216,744 B2 | 2/2019 | Yap et al. | |
| 11,513,772 B1* | 11/2022 | Gross | H04L 67/10 |
| 2008/0104393 A1 | 5/2008 | Glasser et al. | |
| 2015/0163206 A1 | 6/2015 | McCarthy et al. | |
| 2018/0278500 A1* | 9/2018 | Feamster | H04L 43/20 |
| 2020/0279003 A1 | 9/2020 | Dupont et al. | |
| 2020/0358599 A1 | 11/2020 | Angel et al. | |
| 2020/0364608 A1 | 11/2020 | Anwar et al. | |
| 2021/0083855 A1 | 3/2021 | Polleri et al. | |
| 2021/0182729 A1 | 6/2021 | George et al. | |
| 2021/0209099 A1* | 7/2021 | Marsden | G06F 16/2465 |
| 2021/0342725 A1* | 11/2021 | Marsden | G06F 18/217 |
| 2022/0067181 A1 | 3/2022 | Carley | |

(Continued)

OTHER PUBLICATIONS

Lu HM, Kwong A, Unpingco J. Securing Your Collaborative Jupyter Notebooks in the Cloud using Container and Load Balancing Services. arXiv preprint arXiv:2006.01818. Jun. 2, 2020. (Year: 2020).*

(Continued)

*Primary Examiner* — Syed A Zaidi

(74) *Attorney, Agent, or Firm* — Potomac Law Group, PLLC

(57) ABSTRACT

Embodiments secure data on a cloud based network that comprises one or more machine learning ("ML") notebooks. Embodiments monitor activity on each of the ML notebooks, the activity including one or more commands. Embodiments classify each of the commands, the classifying including generating input parameters. Based on the input parameters, embodiments determine a risk score for each of the ML notebooks. When the risk score exceeds a predetermined threshold, embodiments generate an alert.

20 Claims, 10 Drawing Sheets

(56) References Cited

U.S. PATENT DOCUMENTS

2022/0405065 A1* 12/2022 Appel ................ G06F 8/73
2022/0413821 A1   12/2022 Cmielowski et al.
2023/0319069 A1* 10/2023 Birch ............ H04L 63/1466
                                                            726/22

OTHER PUBLICATIONS

NPL Search Terms (Year: 2024).*

* cited by examiner

Fig. 6

CLOUD BASED MACHINE LEARNING NOTEBOOK DATA LOSS PREVENTION

One embodiment is directed generally to a computer system, and in particular to cloud based data loss prevention computer system.

BACKGROUND INFORMATION

Cloud service providers provide various services in the "cloud", meaning over a network, such as the public Internet, and remotely accessible to any network-connected client device. Examples of the services models used by cloud service providers (also referred to herein as "cloud providers" or "providers") include infrastructure as a service ("IaaS"), platform as a service ("PaaS"), software as a service ("SaaS"), and network as a service ("NaaS"). IaaS providers provide customers with infrastructure resources such as processing, storage, networks, and other computing resources that the customer is able to use to run software. The customer does not manage the infrastructure, but has control over operating systems, storage, and deployed applications, among other things, and may be able to control some networking components, such as firewalls. PaaS providers provide a customer with a platform on which the customer can develop, run, and manage an application without needing to maintain the underlying computing infrastructure. SaaS is a software licensing and delivery model in which software is licensed to a customer on a subscription basis, and is centrally hosted by the cloud provider. Under this model, applications can be accessed, for example, using a web browser. NaaS providers provide network services to customers, for example, by provisioning a virtual network on the network infrastructure operated by another party. In each of these service models, the cloud service provider maintains and manages the hardware and/or software that provide the services, and little, if any, software executes on a user's device.

Customers of cloud service providers, which are also referred to herein as users and tenants, can subscribe to the service provider to obtain access to the particular services provided by the service provider. The service provider can maintain an account for a user or tenant, through which the user and/or tenant can access the provider's services. The service provider can further maintain user accounts that are associated with the tenant, for individual users.

One service provided by cloud service providers is security of data. One type of data security, referred to as "data loss prevention" ("DLP"), uses systems to detect potential data breaches/data ex-filtration transmissions and prevent them by monitoring, detecting and blocking sensitive data while in use (endpoint actions), in motion (network traffic) and at rest (data storage). DLP systems operate generally to identify, monitor use of, and to control user operations on sensitive information within an enterprise computing environment. DLP systems are designed to prevent data flow from inside the network to the outside world. This data flow may be unintentional or intentional. Unlike event-based notification systems, DLP provides a policy based approach for managing how data is discovered and classified on a user's workstation or file server, also known as an "endpoint."

SUMMARY

Embodiments secure data on a cloud based network that comprises one or more machine learning ("ML") notebooks. Embodiments monitor activity on each of the ML notebooks, the activity including one or more commands. Embodiments classify each of the commands, the classifying including generating input parameters. Based on the input parameters, embodiments determine a risk score for each of the ML notebooks. When the risk score exceeds a predetermined threshold, embodiments generate an alert.

BRIEF DESCRIPTION OF THE DRAWINGS

Further embodiments, details, advantages, and modifications will become apparent from the following detailed description of the embodiments, which is to be taken in conjunction with the accompanying drawings.

FIG. 6 illustrates a plurality of notebook cells with at least one cell obfuscated in accordance to embodiments.

DETAILED DESCRIPTION

Embodiments provide data loss prevention ("DLP") from within cloud based machine learning notebooks where feature engineering tasks may not directly appear to expose direct data losses. Instead, in embodiments, feature engineering commands are evaluated for levels of data security risks, and alerts are generated when the risks exceed an acceptable level.

As disclosed, known DLP systems/solutions generally focus on storage, networks, and end points in order to prevent direct data losses. However, there generally is no known DLP solution available to track and monitor the data loss of sensitive assets during feature engineering, model training and model inference processes that are implemented and executed within a machine learning ("ML") notebook. Therefore, there are additional risks of indirect data losses. Specifically, although the data access may be provided for personal identifier information ("PII"), ML data scientists working within an ML notebook can create a variety of visualizations, features and calculations that may lead to indirect data loss of PII and other types of data.

For example, an ML data scientist may plot a scatter graph of PII data (e.g., age, salary, credit score) in a chart and share the chart in a local disk for future reference. However, the plots can be easily reverse engineered to gauge patterns and at times it may feed into subsequent attacks knowing the profile of the data analyzed using transformation and visualization. While the individual data asset columns and rows can be flagged for PII so that security teams may be alerted for downloads or external usage, it is also important to protect and prevent any subsequent downstream operations or transformation data loss/extrication in the feature engineering or training phase. This loss may lead to similar security risks as with direct data losses because the data is transformed, modeled, or represented as data proxies which can copied or extricated.

Because the data and feature engineering possibilities are complex and varied in nature, it is difficult to detect possible indirect data losses. Embodiments provide a system/service to support forensic investigations if there are data breaches and leaks in the act of feature engineering as part of DLP that rise to a predetermined level of risk.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
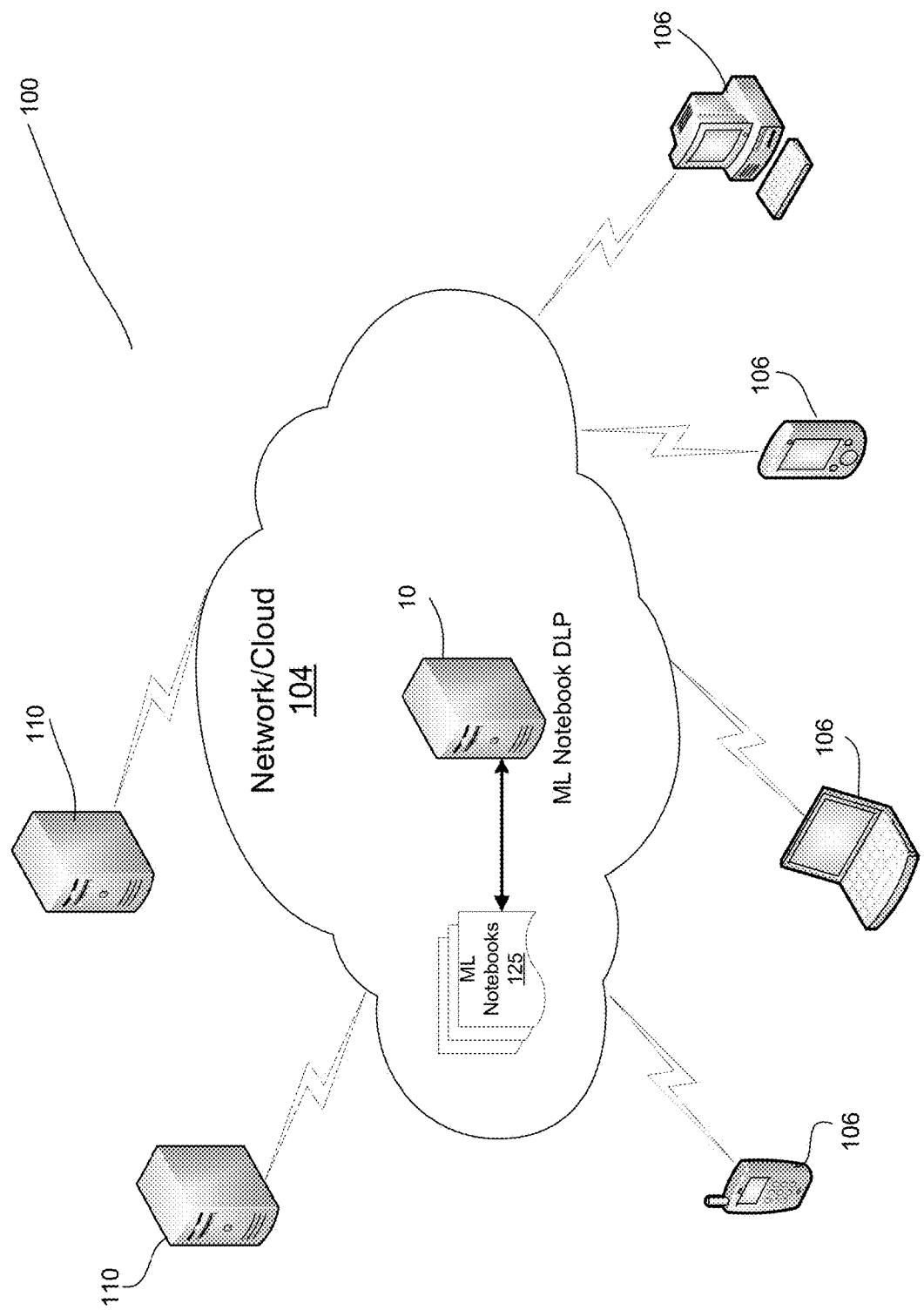
FIG. 1 illustrates an example of a system that includes an ML notebook DLP system in accordance to embodiments.

FIG. 1 illustrates an example of a system 100 that includes an ML notebook DLP system 10 in accordance to embodiments. ML notebook DLP system 10 may be implemented within a computing environment that includes a communication network/cloud 104. In embodiments, ML notebook DLP system 10 is implemented as a plugin. Network 104 may be a private network that can communicate with a public network (e.g., the Internet) to access services 110 provided by a cloud services provider. Examples of communication networks include a mobile network, a wireless network, a cellular network, a local area network ("LAN"), a wide area network ("WAN"), other wireless communication networks, or combinations of these and other networks. ML notebook DLP system 10 may be administered by a service provider, such as via the Oracle Cloud Infrastructure ("OCI") from Oracle Corp.

Tenants of the cloud services provider can be organizations or groups whose members include users of services offered by service provider. Services may include or be provided as access to, without limitation, an application, a resource, a file, a document, data, media, or combinations thereof. Users may have individual accounts with the service provider and organizations may have enterprise accounts with the service provider, where an enterprise account encompasses or aggregates a number of individual user accounts.

System 100 further includes client devices 106, which can be any type of device that can access network 104 and can obtain the benefits of the functionality of ML notebook DLP system 10 of DLP and risk analysis of ML notebook activities. As disclosed herein, a "client" (also disclosed as a "client system" or a "client device") may be a device or an application executing on a device. System 100 includes a number of different types of client devices 106 that each is able to communicate with network 104.

Executing on cloud 104 is a plurality of ML notebooks 125. Each ML notebook 125 can be executed by a customer of cloud 104. In embodiments, each customer can use multiple notebooks 125, but a single notebook 125 is not shared by multiple customers. In general, ML or "data science" notebooks 125 have become an integral tool for data scientists across the world. ML notebooks 125 are highly-interactive multi-purpose tools that allow a data scientist to write and execute code and, at the same time, analyze intermediate results to gain insights, using tables or visualizations, while working on a project. Example ML notebooks include the open source "Jupyter Notebook" and "Apache Zeppelin" ML notebooks. ML notebooks 125 are generally implemented as a computational interpreter. In general, embodiments can be implemented with any type of ML notebooks that interface with one or more ML notebook servers (not shown within cloud 104), including the Jupyter Notebook and any other Python based notebook (referred to generically as a "Python notebook").

In one embodiment, "Oracle Machine Learning Notebooks" from Oracle Corp. are implemented as ML notebooks 125. Oracle ML Notebooks provide a collaborative user interface for data scientists and business and data analysts who perform machine learning in Oracle Autonomous Database—both Autonomous Data Warehouse ("ADW") and Autonomous Transaction Processing ("ATP"). Oracle Machine Learning Notebooks enable data scientists, citizen data scientists, and data analysts to work together to explore their data visually and develop analytical methodologies. An interface provides access to high performance, parallel and scalable in-database implementations of machine learning algorithms via SQL and PL/SQL, with support for Python and R. Oracle ML Notebooks use Apache Zeppelin technology, enabling teams to collaborate to build, assess, and deploy machine learning models. Multi-user collaboration enables the same notebook to be opened simultaneously by different users, such that notebook changes made by one user are instantaneously reflected to notebook viewers.

In general, an ML notebook includes a sequence of cells. A cell is a multiline text input field. The execution behavior of a cell is determined by the cell's type. For embodiments that implement the Jupyter Notebook, there are three types of cells: code cells, markdown cells, and raw cells. Every cell starts off being a code cell, but its type can be changed by using a drop-down on the toolbar (which will be "code", initially), or via keyboard shortcuts, and each cell can be a multiline input file.

In embodiments, ML notebook DLP system 10 is implemented as a single plugin for every one of ML notebooks 125. The plug-in embodiment provides for a flexible method of adding logic for detecting DLP issues where the implementation of the plugin can be done by the administrator of cloud 104 or by third parties. In other embodiments, ML notebook DLP system 10 is implemented as a separate server on or servers on cloud 104 coupled to ML notebooks 125.

Figure 2:
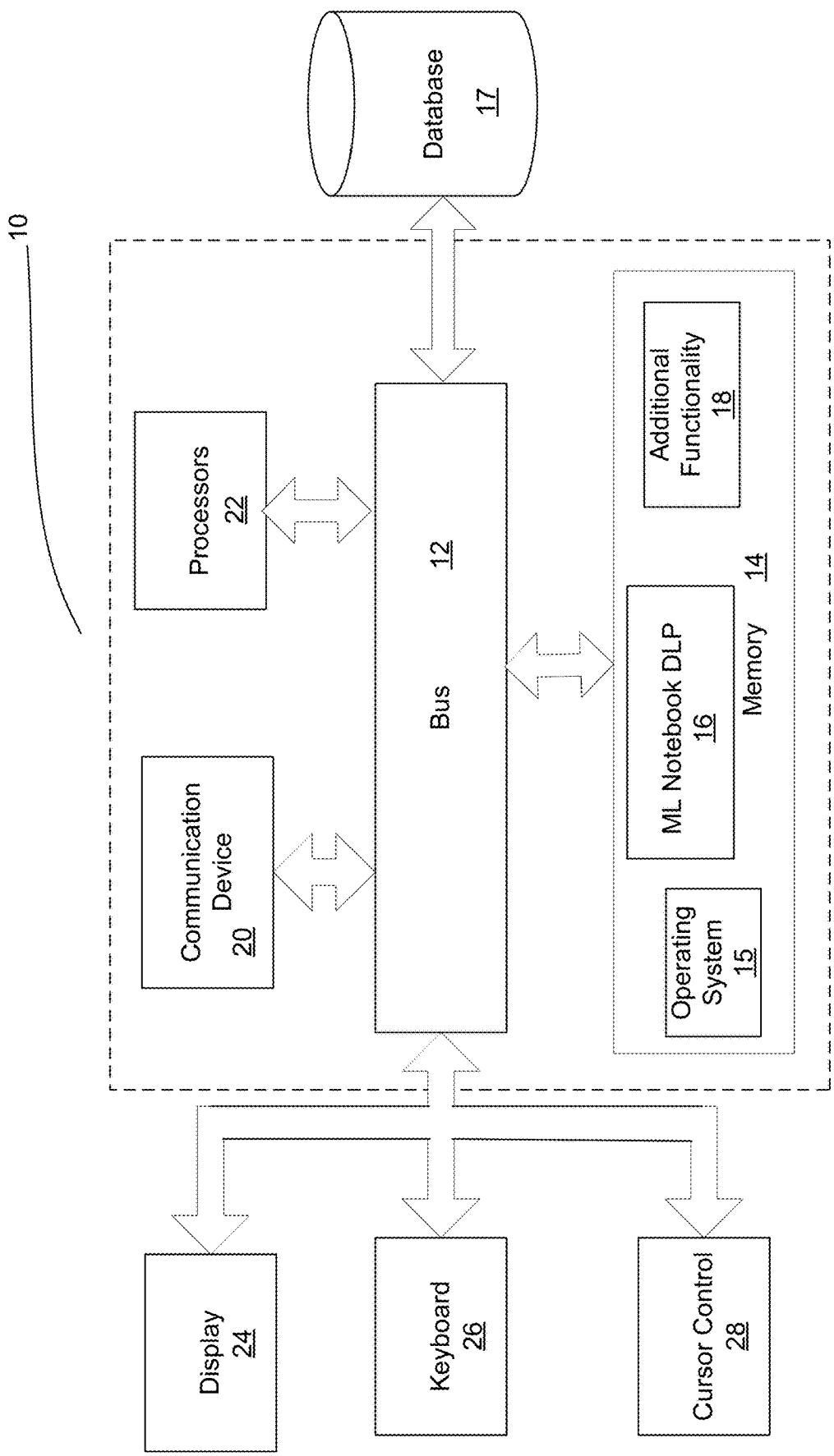
FIG. 2 is a block diagram of the ML notebook DLP system of FIG. 1 in the form of a computer server/system in accordance with an embodiment of the present invention.

FIG. 2 is a block diagram of ML notebook DLP system 10 of FIG. 1 in the form of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include an ML notebook DLP module 16 that provides DLP for each of an ML notebook 125 on cloud 104, and all other functionality disclosed herein. System 10 can be part of a larger system. Therefore, system 10 can include one or more additional functional modules 18 to include the additional functionality, such as any other functionality provided by the Oracle Cloud Infrastructure ("OCP") from Oracle Corp., including the "Cloud Guard" from Oracle Corp. A file storage device or database 17 is coupled to bus 12 to provide centralized storage for modules 16 and 18, including data regarding libraries generated by ML notebook users during feature engineering development sessions. In one embodiment, database 17 is a relational database management system ("RDBMS") that can use Structured Query Language ("SQL") to manage the stored data.

In one embodiment, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

As disclosed, in contrast to known DLP solutions that focus on preventing data loss in storage, networks, and end points, embodiments use a framework approach and include a rule engine that can be defined at an organization level by security controls to limit and report the violations on DLP of ML notebooks based transformed data and visualizations. Embodiments can revise/enhance policy frameworks and solutions to build additional capability using a rule-based approach. When a transformation is detected, embodiments can generate alerts, and can be integrated with third party DLP plugins.

Embodiments, when using a plugin framework, can be deployed on ML notebook 125 instances where the data transformation and visualization operations can be flagged and monitored at every step of execution based on PII or sensitive data used. Further, the framework components/plugin can run as a standalone scan for ML jobs and Python as a custodian of monitoring such transformation and generate such alerts. The alerts can be integrated as part of a logging framework with adequate risk levels so that it can be flagged as security incidents for further investigation.

Figure 3:
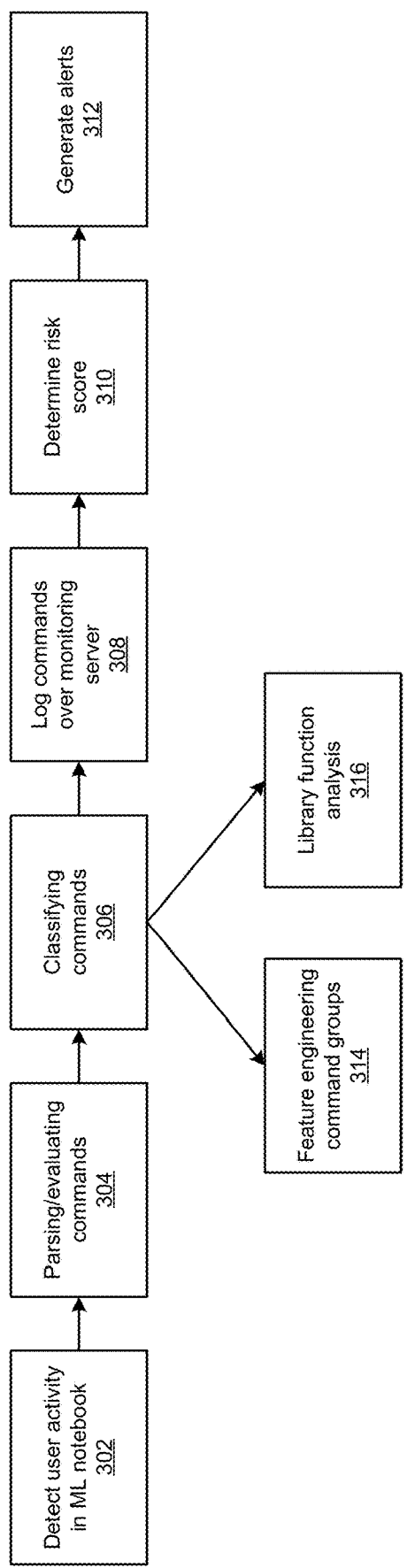
FIG. 3 is a flow diagram of the functionality of the system of FIG. 1 for providing DLP for ML notebooks in accordance with one embodiment.

FIG. 3 is a flow diagram of the functionality of system 100 of FIG. 1 for providing DLP for ML notebooks in accordance with one embodiment. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302, as a user engages in activity in a ML notebook 125, the activity is detected. Each ML notebook 125 cell is monitored individually, as disclosed in more detail below. Embodiments determine what the user is doing within the notebook. For example, a data scientist may execute code in ML notebook 125 using jobs, notebook, and function. "Jobs" is the way to schedule a Python script for execution similar to a batch mode, "notebook" is the step by step command execution and "function" is also a batch mode execution but the state is not maintained. During this time, ML pipeline execution commands (i.e., notebook commands), particularly in the form of Python or R script, are scanned for every command to determine the nature of the command (i.e., what the command is doing). Details on how the activity of each cell of an ML notebook can be monitored is disclosed in more detail below.

At 304, based on the scanning, a command parser parses and evaluates the nature of the command that is processing the datasets and whether the processing involves PII datasets (i.e., personable identifiable information that can be used alone or in tandem with other relevant data to identify an individual).

At 306, the commands parsed at 304 are classified. In embodiments, each command is classified as either a feature engineering command at 314 or an ML library command at 316. Classification of commands is done based on feature engineering commands from popular known libraries or if the library is contributed by the user, then an automatic analysis of library routines/functions are done for assessing the risk of sensitive/PII data sharing. In embodiments, the automated analysis is done by searching for regular available commands through a pattern matching algorithm where there is a command dictionary of general purpose and popular libraries are available. As more libraries are added by users, embodiments can assign risk scores to new libraries. For example, if the library is based on known dictionary commands, it is classified as low risk and new commands which are not mentioned in the dictionary is treated as a high risk.

While it is more difficult to detect every action in an ML library, particularly for user provided libraries for which not much information may initially be known, embodiments track the lineage of operations done with the library and common actions such as export, save, print, etc. which has the most potential to pose the risks. For example, the library analysis in embodiments is done using pattern matching of the dictionary of commands available. Embodiments can use dictionaries of known popular libraries such as pytorch, tensorflow, pandas, keras, scikit learn, etc.

If the command is identified as a feature engineering command at 314, such as a data transformation, conversion or any type of data manipulation to export, save or build visualizations, these commands are logged into a monitoring server/service at 308. In embodiments, the monitoring server is a cloud service on cloud 104 (not shown) where every activity is reported in the form of an audit trail of events. Embodiments use a time series database that stores the activity as timeline based data. In embodiments, the monitoring server is separate from ML notebook DLP plugin 10, operating within ML notebooks 125, which communicates with the monitoring server. Similarly, feature commands for libraries identified at 316 are logged with an identify of the library that is executing the commands.

At 310, a risk score is determined based on the following input parameters that are generated at 306, which are each associated with the command itself (i.e., the logged feature engineering commands from 314 and/or the logged commands from the libraries at 316): (1) The type of command (e.g., transform, convert, extract); (2) The type of data used (e.g., PII, non-PII, experimental); and (3) The type of activity done (e.g., export, save, plot in console, etc.). The type of activity can be limited to known actions.

At 312, if the risk score exceeds a predetermined threshold, one or more alerts are generated. The risk scores and alerts in embodiments are generated on a per ML notebook 125 basis. For example, one or more of ML notebooks 125 may have a high risk score and need to be flagged. In embodiments, the alerts may be included as part of a risk dashboard that classifies all ML notebooks of an organization. For example, out of 100 notebooks of an organization, the dashboard may indicated that 30% are high risk and 70% are low risk, and the high risk notebooks are using at risk PII data. Based on a given alert or threshold value, or in addition to an alert, a user can control of the content of an ML notebook 125 by restricting the content via cell obfuscation, disclosed below. A list of cells flagged for obfuscation may also be output in conjunction with the alert. A cell to be shown to other users can be blocked if it has sensitive data extracted or used for any action purposes such as print.

How the risk score is determined can be provided by the operator of cloud 104 (i.e., the cloud infrastructure provider), or customers can define the rules to determine the score. In one embodiment, when determined by the cloud infrastructure provider, the following weighted approach based on the above input parameters is used to provide a score from 1 (low) to 10 (high). Each of the above parameters can be ranked with High, Medium or Low scores and an average score can be calculated for the total risk score. The score can be a configuration given to cloud customers to fine tune their alerts/thresholds.

The below tables provide example risk scores for each type of input parameters:

| Command Type | Risk | Score | Example |
| --- | --- | --- | --- |
| Transform | Medium | 7 | Log transformation |
| Convert | Medium | 7 | Dividing one attribute with another Ex: Body mass index = Weight/Height*Height |
| Extract | High | 8-10 | Getting data into another format or medium |

| Data Type | Risk | Score | Example |
| --- | --- | --- | --- |
| PII | High | 8-10 | All PII information |
| Non-PII | Medium | 7 | Non-PII information |
| Experimental/Open source | Low | 3-4 | Data from internet |

| Activity Type | Risk | Score | Example |
| --- | --- | --- | --- |
| Print | High | 8-10 | Printing to devices, saving as pdf et al |
| Export | High | 8-10 | Exporting as a file |
| Plotting in console | Low | 3-4 | Showing inside notebook console |

As an example, consider the below pseudocode of an ML notebook command in which a salary column is transformed with log transformation for smoothening for a normal distribution plot:

df_log['salary']=np.log(df['salary'])
sns.distplot(df_set['salary'], fit=norm)
fig=plt.figure( )

After 302, 304 and 306, the commands above will be output and logged for tracking purposes at 308 and the following risk score is determined:

Type of command: Transformation
Data used: PII
Activity: Plot
Risk Score=Medium (7)+High (10)+Low (4)=21/30=7
  (Medium risk score will be logged)
Logging format:
Log: <notebook name>: <Time stamp>: <Line numbers>: <Command
type>:<data>:<activity>:<Risk score>
Logging entry sample:
Hrdata.ipynb:2/24/2022:10:30:00:15-20:transformation: PII:plot:7

Notebook Cell Obfuscation and Restriction

In addition to the above disclosed functionality of DLP for an ML notebook, ML notebook DLP 10 can also restrict cell access at the notebook level so that the cells are masked or removed based on the access permission level. The restriction of cell access can be as a result or in addition to the alert generated based on a risk score threshold, which can also output a list of cells flagged for obfuscation. As part of this functionality, individual cells of each ML notebook 125 can be monitored and classified, which can be used to implement the functionality of 302, 304 and 306 of FIG. 3 above. In one embodiment, the functionality is implemented in conjunction with the ML notebook DLP functionality disclosed above. Specifically when the risk score is high (i.e., exceeds a threshold) and the alert is generated, this could trigger an automatic obfuscation of all the high-risk cells whenever a notebook is exported or shared with a third party.

In other embodiments, the functionality can be used in any environment where restricting cell access at a notebook level is needed. For example, one cloud user of cloud 104 can restrict/obfuscate/mask any number of cells from an ML notebook 125 when sharing that notebook to another cloud user of cloud 104. For example, a cell can be obfuscated while sharing and the proprietary algorithm behind it can be secured and shared for experimentation at the same time. Cells can be restricted at a group level, user level, etc. On a per cell basis, access to each cell can be controlled and provided to a user and/or a group of users.

Figure 4:
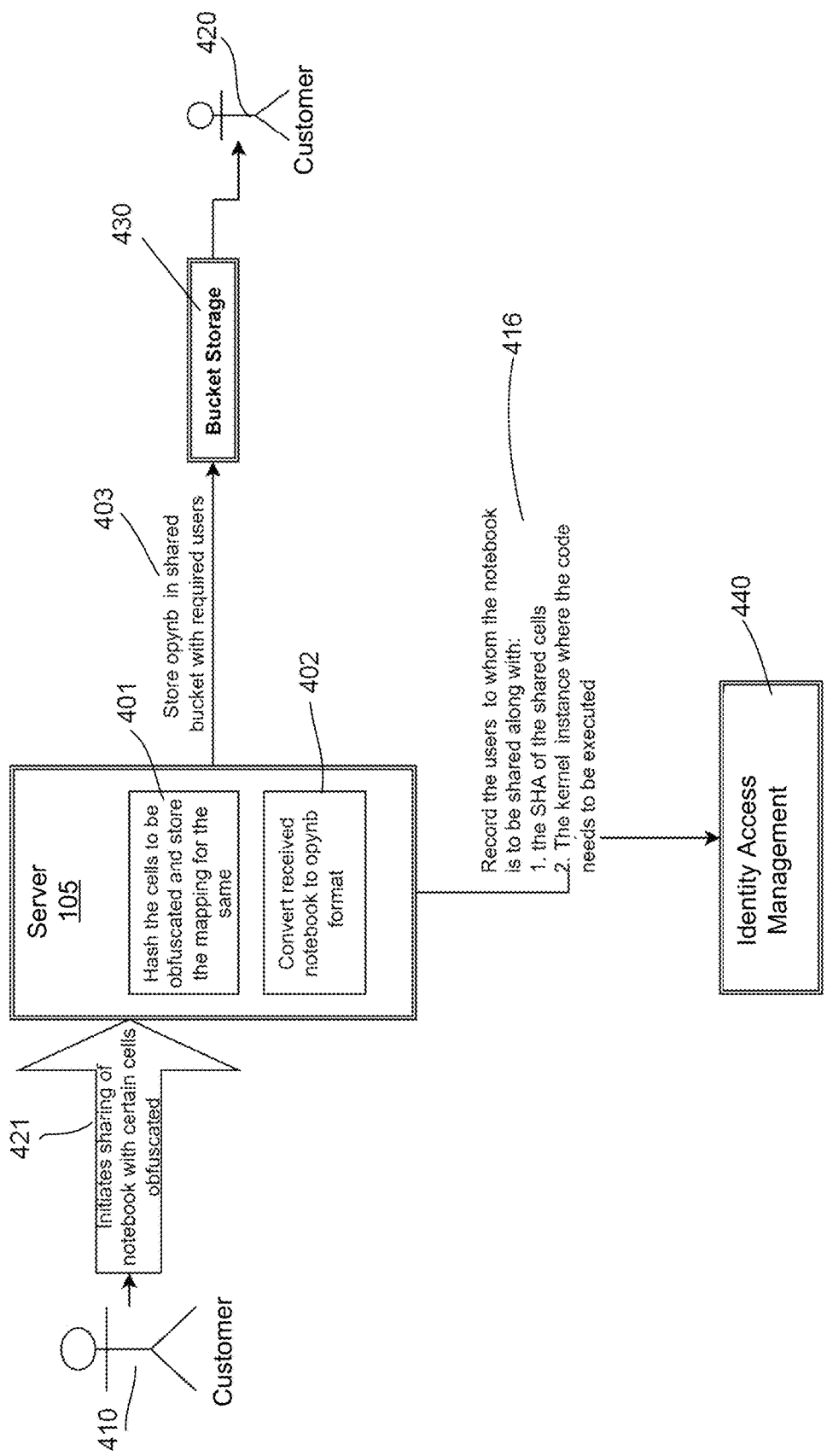
FIG. 4 is a block diagram and flow diagram illustrating the functionality of the ML notebook DLP for generating notebook cell obfuscation and restriction in accordance to embodiments.

FIG. 4 is a block diagram and flow diagram illustrating the functionality of ML notebook DLP 10 for generating notebook cell obfuscation and restriction in accordance to embodiments. In the example of FIG. 4, a cloud customer 410 (i.e., a customer of cloud 104) desires to share a cloud based ML notebook with certain cells obfuscated/restricted with another cloud customer 420 (i.e., a customer of cloud 104). Customer 410 interacts with a cloud server 105 (i.e., a server in cloud 104, but could be the same as server 10).

In general, the cell or group of cells can be shown as a locked or masked manner (i.e., obfuscated) in the notebook. This will be achieved through a secure hash algorithm ("SHA") encryption technique at every cell level based on the permissions and profile access.

When customer 410 issues a command to share a notebook with hidden cells at 421, a cloud notebook server receives the command and encrypts the cells required to be masked and forwards the contents to server 105. In embodiments, the user selects the cell from a user interface and asks the system to restrict access to that cell. Server 105 at 401 hashes the cell contents, using a secure hash algorithm ("SHA") to be obfuscated and stores the contents/mapping (i.e., the hash key/value mapping) along with the identities of users who can use the hash to execute the cell. In embodiments, AES-256 encryption is used to encrypt the data of the cell and the encrypted data is then stored in a database, such as bucket storage from the Oracle Cloud Infrastructure Object Storage Service in which the default storage tier is referred to as a "bucket", which is a logical container for storing objects. The encryption key can be provided by the user or autogenerated. In embodiments, the contents of the cell are further secured by using one-way SHA256 algorithm which is sent in the notebook with the obfuscated cell.

At 402, the received notebook is converted to Oracle Python Notebook ("opynb") format or any new specialized format that includes custom fields and at 403 is stored in a bucket storage 430 (i.e., a shared file storage system) and shared with the intended customer 420. A conversion will then remove these custom fields and get the obfuscated fields from server 105 if the user has permission, thereby converting it to a generic python notebook format.

Further, at 416, the users to whom the notebook is to be shared is recorded along with the generated SHA key of the shared cells, and the method reach kernel instance where the cell "code" (i.e., the hash value of the code or collection of statements that form the cell) needs to be executed on the kernel instance itself of server 105, which then communicates with IAM 440 to get the permission details. Therefore, at 416, embodiments tell IAM service 440 through API calls as to which cells can be executed by which users (i.e., access permissions of the user).

Figure 5:
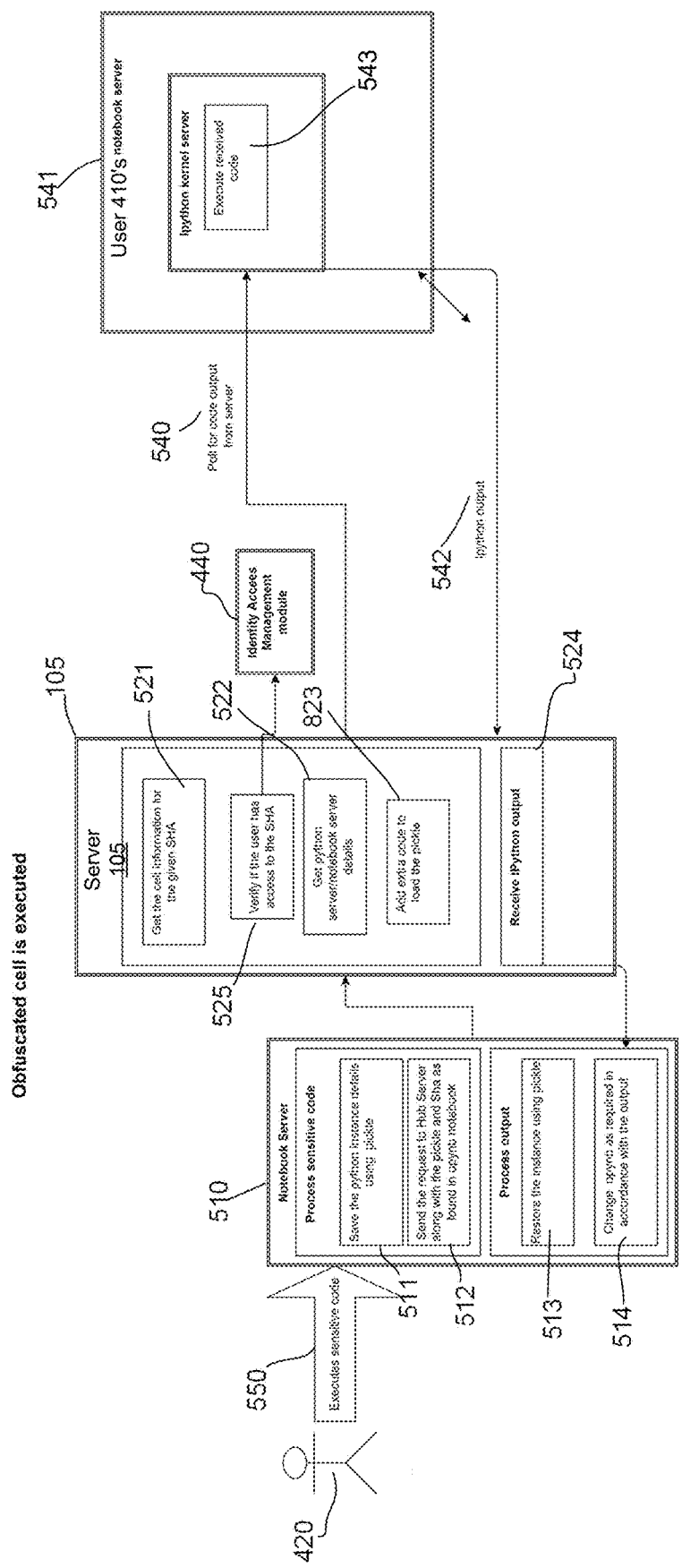
FIG. 5 is a block diagram and flow diagram illustrating the functionality of the ML notebook DLP for executing obfuscated notebook cells in accordance to embodiments.

FIG. 5 is a block diagram and flow diagram illustrating the functionality of ML notebook DLP 10 for executing obfuscated notebook cells in accordance to embodiments. In FIG. 5, cloud customer 420 executes the sensitive/proprietary code (i.e., code in an obfuscated cell). The customer "executes" the cell from their perspective and in the background embodiments receive the hashed value that was generated by server 105 and find its mapping to the actual code. Embodiments then send that command to the notebook kernel server 510 to be executed.

FIG. 5 illustrates how an external customer 420 (e.g., a collaborator 125) can execute proprietary code of an obfuscated cell securely and seamlessly. The functionality of FIG. 5 ensures that none of the data is leaked to external customer 420 without the permission of the owner of the data (i.e., customer 410) by securing the proprietary code inside cloud server 105 which can only be executed after the following two conditions are matched:

The external customer 420 has the correct SHA key.
The external customer 420 is authorized to execute the code by the owner which will be managed though IAM service 440

In detail, a notebook server 510 (e.g., a notebook server that can interact with a local kernel server) at 511 processes the sensitive code by saving the python instance details using pickle. Pickle in Python is primarily used in serializing and deserializing a Python object structure. In other words, it is the process of converting a Python object into a byte stream to store it in a file/database, maintain program state across sessions, or transport data over the network. At 512, the request is sent to server 105 along with the pickle and the SHA as found in the opynb notebook.

Server 105 at 521 processes the SHA and pickle by getting the cell information for the given SHA, and at 522 getting the python server/notebook server details. At 523, extra code is added to load the pickle. For example the serializing/deserializing of the python environment can be done using the "dill" module by adding the following lines of code:
import dill
dill. dump_session('notebook_env.db')
and to load the env
import dill
dill. load_session('notebook_env.db')

At 540, the code output from the server is polled from a notebook server 541 of customer 410. In embodiments, whenever a notebook session is created, a corresponding notebook server is also created. In response, Interactive Python ("Ipython") kernel server 543 executes the receive code and generates an Ipython output at 542 which is sent to server 105 at 524. At 525, using IAM server 440, the user is verified if they have access to execute the code using SHA.

Using the Ipython output 542, the output is processed at 513 to restore the instance using pickle, and the opynb is changed as required in accordance with the input. The following pseudo-code provides examples of a change:

```
"outputs": [
    {
        "data": {
            "text/plain": [
                "16"
            ]
        },
        "execution_count": 2,
        "metadata": { },
        "output_type": "execute_result"
    }
]
```

Even if someone manages to get past these security mechanisms disclosed above, they will not be able to see the code which is actually getting executed because the code is stored in encrypted format which can only be decrypted by the notebook owner's (customer 410) cloud notebook server.

The external customer (customer 420) also does not have to suffer with poor experience because of the additional security measures because the above functionality allows for the preserving of the python environment across execution by synchronizing the environment state using pickles. Therefore, customer 420 can execute the obfuscated code the same as any other code. For example, only values of certain variables can be selected to be shared.

Figure 6:
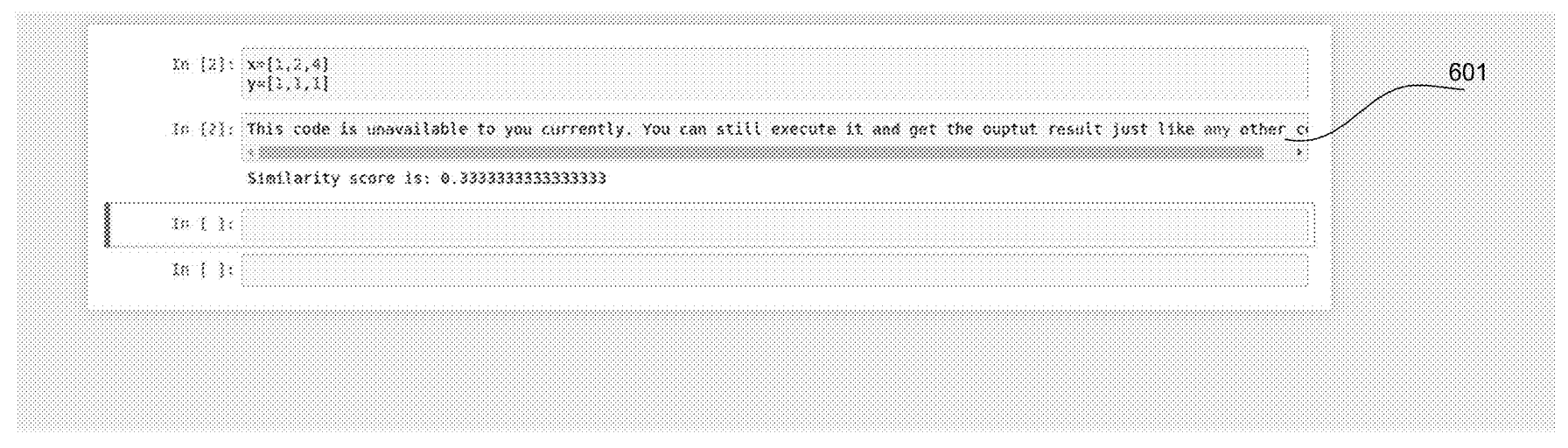

FIG. 6 illustrates a plurality of notebook cells with at least one cell obfuscated in accordance to embodiments. Specifically, in the example of FIG. 6, customer 410 is sharing the notebook in which they has a proprietary scoring function in cell 601. As shown, no code is actually exposed to the customer with whom this notebook is shared and they are also able to execute the code seamlessly. Cell 601, if not obfuscated, would show the actual code being executed.

In embodiments that use Oracle Python Notebook ("Opynb") notebook format, this format supports secure sharing of data in addition to the features supported by the .ipynb notebook format (i.e., a notebook document created by a Jupyter Notebook). In this format there are two additional JavaScript Object Notation ("JSON") values that facilitate secure remote execution such as SHA, details on how to reach the notebook server, etc.: (1) Hash: hashed values for the obfuscated cell; and (2) Notebook Hub: server fully qualified domain name ("FQDN"). The format will be backwards compatible (i.e., any ipython notebook can be seamlessly converted to the Opynb format). Further, in embodiments, an ML notebook 125 can be shared outside of cloud 104 as long as: (1) the local notebook server understands the opynb file format; and (2) the local notebook server has a network configuration that gives the notebook access to server 105 in the cloud.

Example Cloud Infrastructure

FIGS. 7-10 illustrate an example cloud infrastructure that can incorporate the ML notebook DLP system in accordance to embodiments. The cloud infrastructure of FIGS. 7-10 can be used to implement network/cloud 104 of FIG. 1. In one embodiment, notebook instances are run on a Data plane (described below) while the permissions and controls are managed in the Control plane layer (described below).

As disclosed above, infrastructure as a service ("IaaS") is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network ("WAN"), such as the Internet, and can use the cloud provider's services to install the remaining elements of an application stack. For example, the user can log in to the IaaS platform to create virtual machines ("VM's"), install operating systems ("OS"s) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds ("VPC"s) (e.g., a potentially on-demand pool of configurable and/or shared computing resources), also known as a core network. In some examples, there may also be one or more security group rules provisioned to define how the security of the network will be set up and one or more virtual machines. Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
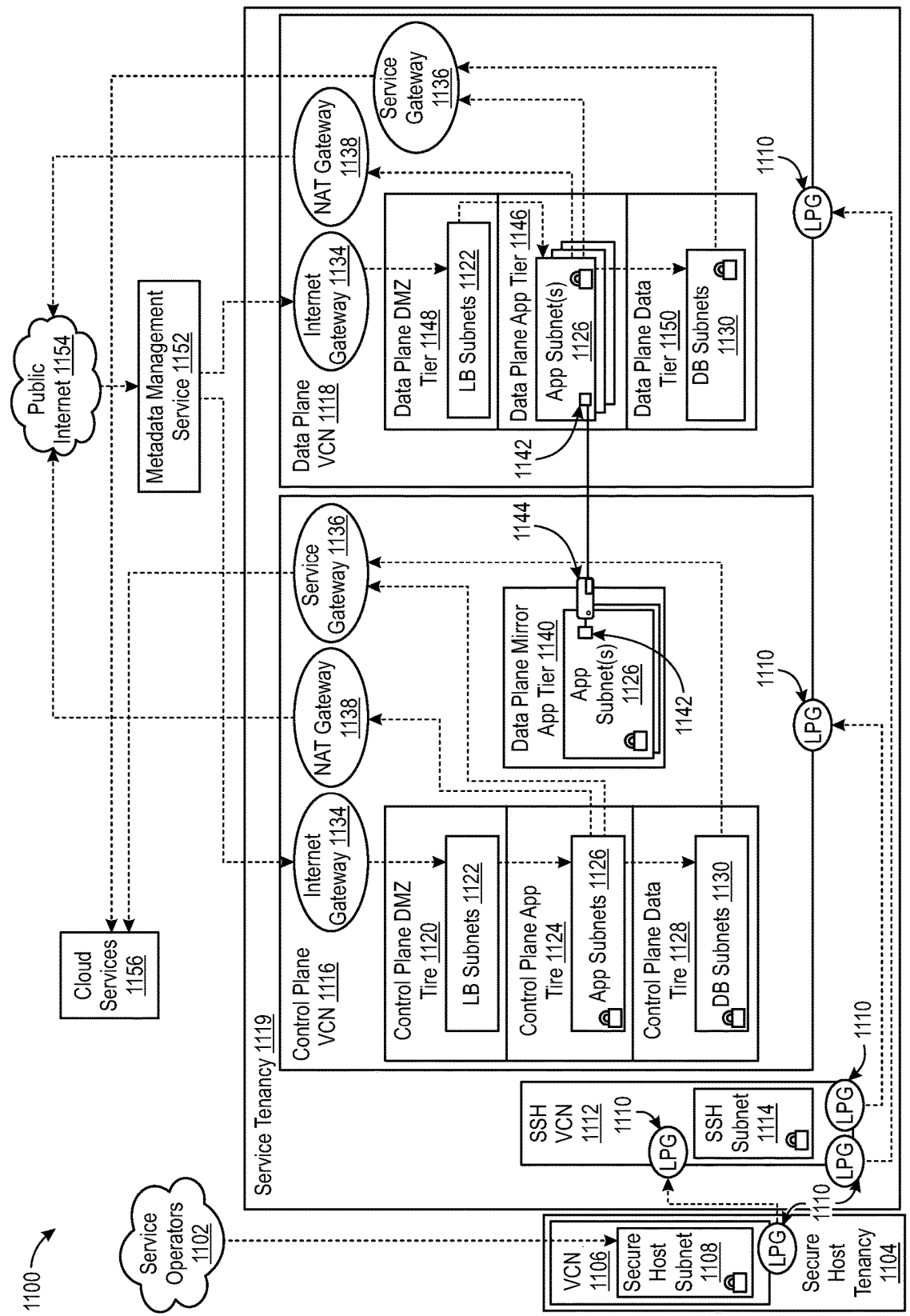
FIGS. 7-10 illustrate an example cloud infrastructure that can incorporate the ML notebook DLP system in accordance to embodiments.

FIG. 7 is a block diagram 1100 illustrating an example pattern of an IaaS architecture, according to at least one embodiment. Service operators 1102 can be communicatively coupled to a secure host tenancy 1104 that can include a virtual cloud network ("VCN") 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant ("PDA")) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service ("SMS"), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway ("LPG") 1110 that can be communicatively coupled to a secure shell ("SSH") VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone ("DMZ") tier 1120 that acts as a perimeter network (e.g., portions of a corporate network between the corporate intranet and external networks). The DMZ-based servers may have restricted responsibilities and help keep security breaches contained. Additionally, the DMZ tier 1120 can include one or more load balancer ("LB") subnet(s) 1122, a control plane app tier 1124 that can include app subnet(s) 1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively coupled to cloud services 1156.

In some examples, the service gateway 1136 of the control plane VCN 1116 or of the data plane VCN 1118 can make application programming interface ("API") calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or customers, can make requests, for example create, read, update, or delete ("CRUD") operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Memory that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the customer, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or customers from interacting with other users', or other customers', resources. Also, this embodiment may allow users or customers of the system to store databases privately without needing to rely on public Internet 1154, which may not have a desired level of security, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a customer of the IaaS provider without calling public Internet 1154. Customers of the IaaS provider may desire this embodiment since database(s) that the customers use may be controlled by the IaaS provider and may be stored on the service tenancy 1119, which may be isolated from public Internet 1154.

Figure 8:
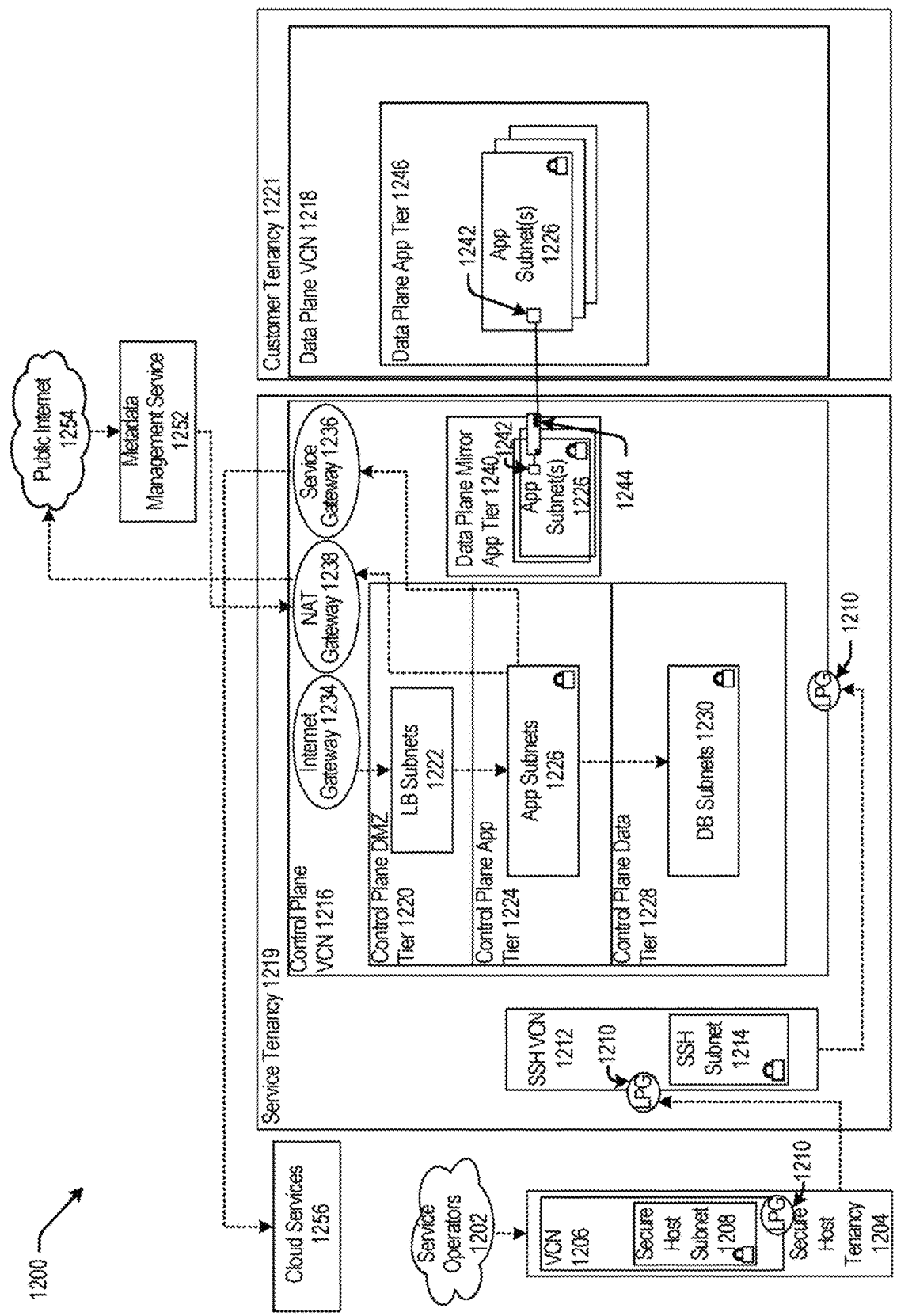

FIG. 8 is a block diagram 1200 illustrating another example pattern of an IaaS architecture, according to at least one embodiment. Service operators 1202 (e.g. service operators 1102) can be communicatively coupled to a secure host tenancy 1204 (e.g. the secure host tenancy 1104) that can include a virtual cloud network (VCN) 1206 (e.g. the VCN 1106) and a secure host subnet 1208 (e.g. the secure host subnet 1108). The VCN 1206 can include a local peering gateway (LPG) 1210 (e.g. the LPG 1110) that can be communicatively coupled to a secure shell (SSH) VCN 1212 (e.g. the SSH VCN 1112 10) via an LPG 1110 contained in the SSH VCN 1212. The SSH VCN 1212 can include an SSH subnet 1214 (e.g. the SSH subnet 1114), and the SSH VCN 1212 can be communicatively coupled to a control plane VCN 1216 (e.g. the control plane VCN 1116) via an LPG 1210 contained in the control plane VCN 1216. The control plane VCN 1216 can be contained in a service tenancy 1219 (e.g. the service tenancy 1119), and the data plane VCN 1218 (e.g. the data plane VCN 1118) can be contained in a customer tenancy 1221 that may be owned or operated by users, or customers, of the system.

The control plane VCN 1216 can include a control plane DMZ tier 1220 (e.g. the control plane DMZ tier 1120) that can include LB subnet(s) 1222 (e.g. LB subnet(s) 1122), a control plane app tier 1224 (e.g. the control plane app tier 1124) that can include app subnet(s) 1226 (e.g. app subnet(s) 1126), a control plane data tier 1228 (e.g. the control plane data tier 1128) that can include database (DB) subnet(s) 1230 (e.g. similar to DB subnet(s) 1130). The LB subnet(s) 1222 contained in the control plane DMZ tier 1220 can be communicatively coupled to the app subnet(s) 1226 contained in the control plane app tier 1224 and an Internet gateway 1234 (e.g. the Internet gateway 1134) that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238 (e.g. the NAT gateway 1138). The control plane VCN 1216 can include the service gateway 1236 and the NAT gateway 1238.

The control plane VCN 1216 can include a data plane mirror app tier 1240 (e.g. the data plane mirror app tier 1140) that can include app subnet(s) 1226. The app subnet(s) 1226 contained in the data plane mirror app tier 1240 can include a virtual network interface controller (VNIC) 1242 (e.g. the VNIC of 1142) that can execute a compute instance 1244 (e.g. similar to the compute instance 1144). The compute instance 1244 can facilitate communication between the app subnet(s) 1226 of the data plane mirror app tier 1240 and the app subnet(s) 1226 that can be contained in a data plane app tier 1246 (e.g. the data plane app tier 1146) via the VNIC 1242 contained in the data plane mirror app tier 1240 and the VNIC 1242 contained in the data plane app tier 1246.

The Internet gateway 1234 contained in the control plane VCN 1216 can be communicatively coupled to a metadata management service 1252 (e.g. the metadata management service 1152) that can be communicatively coupled to public Internet 1254 (e.g. public Internet 1154). Public Internet 1254 can be communicatively coupled to the NAT gateway 1238 contained in the control plane VCN 1216. The service gateway 1236 contained in the control plane VCN 1216 can be communicatively couple to cloud services 1256 (e.g. cloud services 1156).

In some examples, the data plane VCN 1218 can be contained in the customer tenancy 1221. In this case, the IaaS provider may provide the control plane VCN 1216 for each customer, and the IaaS provider may, for each customer, set up a unique compute instance 1244 that is contained in the service tenancy 1219. Each compute instance 1244 may allow communication between the control plane VCN 1216, contained in the service tenancy 1219, and the data plane VCN 1218 that is contained in the customer tenancy 1221. The compute instance 1244 may allow resources that are provisioned in the control plane VCN 1216 that is contained in the service tenancy 1219, to be deployed or otherwise used in the data plane VCN 1218 that is contained in the customer tenancy 1221.

In other examples, the customer of the IaaS provider may have databases that live in the customer tenancy 1221. In this example, the control plane VCN 1216 can include the data plane mirror app tier 1240 that can include app subnet(s) 1226. The data plane mirror app tier 1240 can reside in the data plane VCN 1218, but the data plane mirror app tier 1240 may not live in the data plane VCN 1218. That is, the data plane mirror app tier 1240 may have access to the customer tenancy 1221, but the data plane mirror app tier 1240 may not exist in the data plane VCN 1218 or be owned or operated by the customer of the IaaS provider. The data plane mirror app tier 1240 may be configured to make calls to the data plane VCN 1218, but may not be configured to make calls to any entity contained in the control plane VCN 1216. The customer may desire to deploy or otherwise use resources in the data plane VCN 1218 that are provisioned in the control plane VCN 1216, and the data plane mirror app tier 1240 can facilitate the desired deployment, or other usage of resources, of the customer.

In some embodiments, the customer of the IaaS provider can apply filters to the data plane VCN 1218. In this embodiment, the customer can determine what the data plane VCN 1218 can access, and the customer may restrict access to public Internet 1254 from the data plane VCN 1218. The IaaS provider may not be able to apply filters or otherwise control access of the data plane VCN 1218 to any outside networks or databases. Applying filters and controls by the customer onto the data plane VCN 1218, contained in the customer tenancy 1221, can help isolate the data plane VCN 1218 from other customers and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 8," may be located in Region 1 and in "Region 2." If a call to Deployment 8 is made by the service gateway 1236 contained in the control plane VCN 1216 located in Region 1, the call may be transmitted to Deployment 8 in Region 1. In this example, the control plane VCN 1216, or Deployment 8 in Region 1, may not be communicatively coupled to, or otherwise in communication with, Deployment 8 in Region 2.

Figure 9:
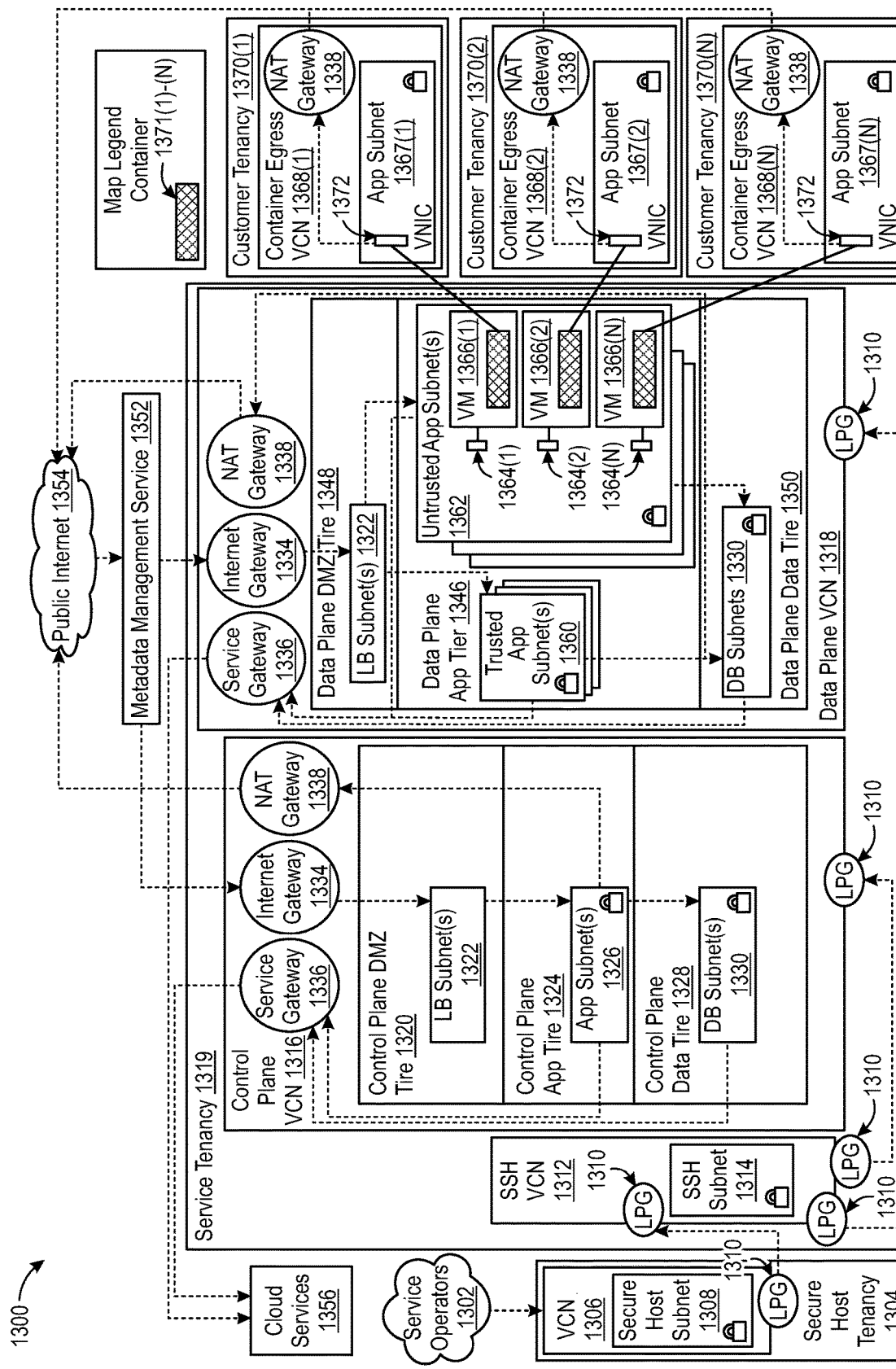

FIG. 9 is a block diagram 1300 illustrating another example pattern of an IaaS architecture, according to at least one embodiment. Service operators 1302 (e.g. service operators 1102) can be communicatively coupled to a secure host tenancy 1304 (e.g. the secure host tenancy 1104) that can include a virtual cloud network (VCN) 1306 (e.g. the VCN 1106) and a secure host subnet 1308 (e.g. the secure host subnet 1108). The VCN 1306 can include an LPG 1310 (e.g. the LPG 1110) that can be communicatively coupled to an SSH VCN 1312 (e.g. the SSH VCN 1112) via an LPG 1310 contained in the SSH VCN 1312. The SSH VCN 1312 can include an SSH subnet 1314 (e.g. the SSH subnet 1114), and the SSH VCN 1312 can be communicatively coupled to a control plane VCN 1316 (e.g. the control plane VCN 1116) via an LPG 1310 contained in the control plane VCN 1316 and to a data plane VCN 1318 (e.g. the data plane 1118) via an LPG 1310 contained in the data plane VCN 1318. The control plane VCN 1316 and the data plane VCN 1318 can be contained in a service tenancy 1319 (e.g. the service tenancy 1119).

The control plane VCN 1316 can include a control plane DMZ tier 1320 (e.g. the control plane DMZ tier 1120) that can include load balancer ("LB") subnet(s) 1322 (e.g. LB subnet(s) 1122), a control plane app tier 1324 (e.g. the control plane app tier 1124) that can include app subnet(s) 1326 (e.g. similar to app subnet(s) 1126), a control plane data tier 1328 (e.g. the control plane data tier 1128) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g. the Internet gateway 1134) that can be contained in the control plane VCN 1316, and the app subnet(s) 1326 can be communicatively coupled to the DB subnet(s) 1330 contained in the control plane data tier 1328 and to a service gateway 1336 (e.g. the service gateway) and a network address translation (NAT) gateway 1338 (e.g. the NAT gateway 1138). The control plane VCN 1316 can include the service gateway 1336 and the NAT gateway 1338.

The data plane VCN 1318 can include a data plane app tier 1346 (e.g. the data plane app tier 1146), a data plane DMZ tier 1348 (e.g. the data plane DMZ tier 1148), and a data plane data tier 1350 (e.g. the data plane data tier 1150 of FIG. 8). The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective customer tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g. public Internet 1154).

The Internet gateway 1334 contained in the control plane VCN 1316 and contained in the data plane VCN 1318 can be communicatively coupled to a metadata management service 1352 (e.g. the metadata management system 1152) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some embodiments, the data plane VCN 1318 can be integrated with customer tenancies 1370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1346. Code to run the function may be executed in the VMs 1366(1)-(N), and the code may not be configured to run anywhere else on the data plane VCN 1318. Each VM 1366(1)-(N) may be connected to one customer tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362), which may help prevent incorrect or otherwise undesirable code from damaging the network of the IaaS provider or from damaging a network of a different customer. The containers 1371(1)-(N) may be communicatively coupled to the customer tenancy 1370 and may be configured to transmit or receive data from the customer tenancy 1370. The containers 1371(1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM 1366(1)-(N) of each customer and that may run code from the customer may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

Figure 10:
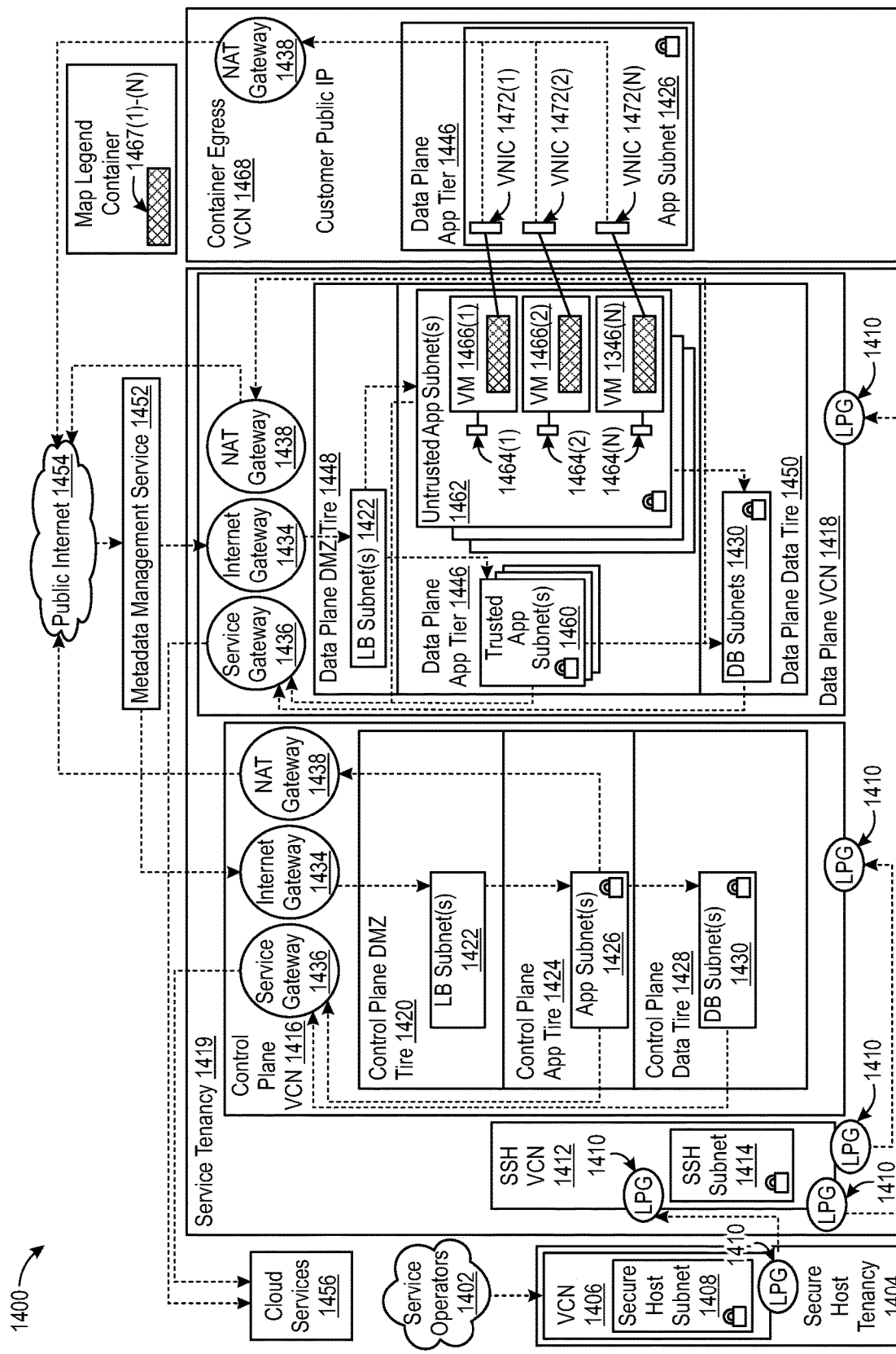

FIG. 10 is a block diagram 1400 illustrating another example pattern of an IaaS architecture, according to at least one embodiment. Service operators 1402 (e.g. service operators 1102) can be communicatively coupled to a secure host tenancy 1404 (e.g. the secure host tenancy 1104) that can include a virtual cloud network ("VCN") 1406 (e.g. the VCN 1106) and a secure host subnet 1408 (e.g. the secure host subnet 1108). The VCN 1406 can include an LPG 1410 (e.g. the LPG 1110) that can be communicatively coupled to an SSH VCN 1412 (e.g. the SSH VCN 1112) via an LPG 1410 contained in the SSH VCN 1412. The SSH VCN 1412 can include an SSH subnet 1414 (e.g. the SSH subnet 1114), and the SSH VCN 1412 can be communicatively coupled to a control plane VCN 1416 (e.g. the control plane VCN 1116) via an LPG 1410 contained in the control plane VCN 1416 and to a data plane VCN 1418 (e.g. the data plane 1118) via an LPG 1410 contained in the data plane VCN 1418. The control plane VCN 1416 and the data plane VCN 1418 can be contained in a service tenancy 1419 (e.g. the service tenancy 1119).

The control plane VCN 1416 can include a control plane DMZ tier 1420 (e.g. the control plane DMZ tier 1120) that can include LB subnet(s) 1422 (e.g. LB subnet(s) 1122), a control plane app tier 1424 (e.g. the control plane app tier 1124) that can include app subnet(s) 1426 (e.g. app subnet(s) 1126), a control plane data tier 1428 (e.g. the control plane data tier 1128) that can include DB subnet(s) 1430 (e.g. DB subnet(s) 1330). The LB subnet(s) 1422 contained in the control plane DMZ tier 1420 can be communicatively coupled to the app subnet(s) 1426 contained in the control plane app tier 1424 and to an Internet gateway 1434 (e.g. the Internet gateway 1134) that can be contained in the control plane VCN 1416, and the app subnet(s) 1426 can be communicatively coupled to the DB subnet(s) 1430 contained in the control plane data tier 1428 and to a service gateway 1436 (e.g. the service gateway of FIG. 8) and a network address translation (NAT) gateway 1438 (e.g. the NAT gateway 1138 of FIG. 8). The control plane VCN 1416 can include the service gateway 1436 and the NAT gateway 1438.

The data plane VCN 1418 can include a data plane app tier 1446 (e.g. the data plane app tier 1146), a data plane DMZ tier 1448 (e.g. the data plane DMZ tier 1148), and a data plane data tier 1450 (e.g. the data plane data tier 1150). The data plane DMZ tier 1448 can include LB subnet(s) 1422 that can be communicatively coupled to trusted app subnet(s) 1460 (e.g. trusted app subnet(s) 1360) and untrusted app subnet(s) 1462 (e.g. untrusted app subnet(s) 1362) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g. public Internet 1154).

The Internet gateway 1434 contained in the control plane VCN 1416 and contained in the data plane VCN 1418 can be communicatively coupled to a metadata management service 1452 (e.g. the metadata management system 1152) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some examples, the pattern illustrated by the architecture of block diagram 1400 of FIG. 10 may be considered an exception to the pattern illustrated by the architecture of block diagram 1300 of FIG. 9 and may be desirable for a customer of the IaaS provider if the IaaS provider cannot directly communicate with the customer (e.g., a disconnected region). The respective containers 1467(1)-(N) that are contained in the VMs 1466(1)-(N) for each customer can be accessed in real-time by the customer. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the customer can be isolated from the control plane VCN 1416 and can be isolated from other entities contained in the data plane VCN 1418. The containers 1467(1)-(N) may also be isolated from resources from other customers.

In other examples, the customer can use the containers 1467(1)-(N) to call cloud services 1456. In this example, the customer may run code in the containers 1467(1)-(N) that requests a service from cloud services 1456. The containers 1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate certain embodiments. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure ("OCI") provided by the present assignee.

As disclosed, embodiments provide DLP for ML notebook commands and cell interaction. In contrast to known DLP solutions that generally focus on data centric approaches, embodiments focus on process centric methods such as the feature engineering phase of ML notebooks which involve complex and varied transformations. The data loss may be equally significant in transformations and embodiments address such process issues in ML activities where it is inevitable that data loss can happen in multiple dimensions without even the data scientists being aware of it. Embodiments, in addition to applying a DLP solution into the ML domain, also create such alerts as part of cloud operations that increases overall process and data asset security which are consumed in multiple ways.

In general, embodiments prevent data loss for ML processes and enhance compliance standards of machine learning pipelines. A ML pipeline is a sequence of steps that are built together into a workflow to achieve a purpose of ML operations such as data cleansing, transformation, ML training and processing. Embodiments prevent breaches of sensitive training information and model assets on a cloud platform.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of securing data on a cloud based network that comprises one or more machine learning (ML) notebooks, the method comprising:
monitoring activity on each of the ML notebooks, wherein each of the ML notebooks comprise an interactive ML software environment with a plurality of cells, the activity comprising one or more commands executed within one or more of the plurality of cells;
classifying each of the commands, the classifying comprising generating input parameters, the input parameters comprising at least one of a type of command, a type of data used in the command, or a type of activity;
based on the input parameters, determining a data security risk score for each of the ML notebooks; and
when the data security risk score exceeds a predetermined threshold, generating a data security alert.

2. The method of claim 1, the input parameters comprise, for each command, the type of command, the type of data used in the command, and the type of activity.

3. The method of claim 2, wherein the type of command comprises at least one of transform, convert or extract.

4. The method of claim 1, the monitoring activity comprising monitoring each of the cells.

5. The method of claim 4, further comprising:
receiving an ML notebook with one or more of the cells designated as a masked cell when the risk score exceeds the predetermined threshold;
encrypting the masked cells;
hashing the masked cell using a corresponding hash; and
storing the hashed masked cell with a corresponding one or more identities of users who can use the hash to execute the masked cell.

6. The method of claim 1, the classifying further comprising determining whether each command is a feature engineering command or an ML library command.

7. The method of claim 1, the determining the risk score comprises weighting the input parameters.

8. The method of claim 1, wherein the ML notebooks are hosted on the cloud based network, and the monitoring, classifying, determining the risk score and generating the alert are executed by a plugin of the ML notebooks.

9. A non-transitory computer readable medium having instructions stored thereon that, when executed by one or more processors on a cloud infrastructure, cause the processors to secure data on a cloud based network that comprises one or more machine learning (ML) notebooks, the securing comprising:
monitoring activity on each of the ML notebooks, wherein each of the ML notebooks comprise an interactive ML software environment with a plurality of cells, the activity comprising one or more commands executed within one or more of the plurality of cells;
classifying each of the commands, the classifying comprising generating input parameters, the input parameters comprising at least one of a type of command, a type of data used in the command, or a type of activity;
based on the input parameters, determining a data security risk score for each of the ML notebooks; and
when the data security risk score exceeds a predetermined threshold, generating a data security alert.

10. The computer readable medium of claim 9, the input parameters comprise, for each command, the type of command, the type of data used in the command, and the type of activity.

11. The computer readable medium of claim 10, wherein the type of command comprises at least one of transform, convert or extract.

12. The computer readable medium of claim 9, the monitoring activity comprising monitoring each of the cells.

13. The computer readable medium of claim 12, the securing further comprising:
receiving an ML notebook with one or more of the cells designated as a masked cell when the risk score exceeds the predetermined threshold;
encrypting the masked cells;
hashing the masked cell using a corresponding hash; and
storing the hashed masked cell with a corresponding one or more identities of users who can use the hash to execute the masked cell.

14. The computer readable medium of claim 9, the classifying further comprising determining whether each command is a feature engineering command or an ML library command.

15. The computer readable medium of claim 9, the determining the risk score comprises weighting the input parameters.

16. The computer readable medium of claim 9, wherein the ML notebooks are hosted on the cloud based network, and the monitoring, classifying, determining the risk score and generating the alert are executed by a plugin of the ML notebooks.

17. A cloud infrastructure comprising:
one or more machine learning (ML) notebooks; and
a plugin for the ML notebooks for securing data on the cloud infrastructure, the securing comprising:
monitoring activity on each of the ML notebooks, wherein each of the ML notebooks comprise an interactive ML software environment with a plurality of cells, the activity comprising one or more commands executed within one or more of the plurality of cells;
classifying each of the commands, the classifying comprising generating input parameters, the input parameters comprising at least one of a type of command, a type of data used in the command, or a type of activity;
based on the input parameters, determining a data security risk score for each of the ML notebooks; and
when the data security risk score exceeds a predetermined threshold, generating a data security alert.

18. The cloud infrastructure of claim 17, the input parameters comprise, for each command, the type of command, the type of data used in the command, and the type of activity.

19. The cloud infrastructure of claim 17, the monitoring activity comprising monitoring each of the cells.

20. The cloud infrastructure of claim 17, the classifying further comprising determining whether each command is a feature engineering command or an ML library command.

* * * * *